United States Patent Office 2,861,236
Patented Nov. 18, 1958

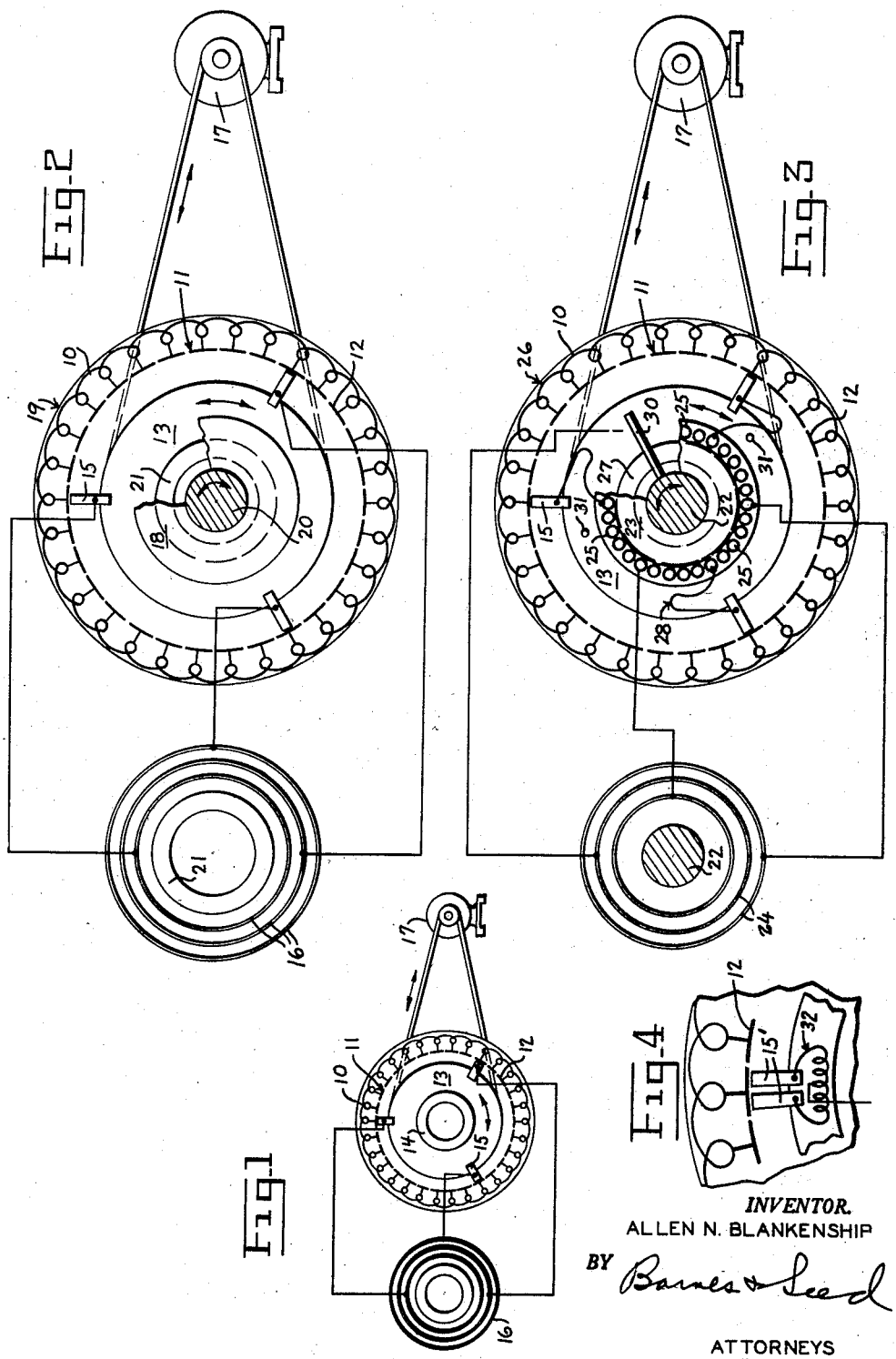

2,861,236

POLYPHASE SLAVE MOTOR

Allen N. Blankenship, Seattle, Wash.

Application March 19, 1956, Serial No. 572,426

3 Claims. (Cl. 318—361)

This invention relates to polyphase slave motors which are similar to the slave motor disclosed in my pending application Serial No. 277,858, filed March 21, 1952, now Patent No. 2,739,278, dated March 20, 1956, in that the stator winding is commuted and the commutating brushes are mounted for piloted rotation independently of both the rotor and the commutator, the speed of the brushes being used to control the speed of the motor.

The invention particularly aims to provide a polyphase variable speed motor with a stepless wide range of speed and a simplified means of control. As further objects the invention aims to provide such a motor which is directly reversible and has a high starting torque.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a schematic of a means for varying the speed of a magnetic field.

Figs. 2 and 3 are schematics of two different polyphase motor embodiments of my invention, part of the rotor being broken away in each instance to show the respective stub shaft for the brush carrier.

Fig. 4 is a fragmentary schematic of a desirable commutation arrangement for my motors.

In Fig. 1 I have illustrated schematically a three-phase winding 10 of a delta type commuted to a commutator 11 having its bars 12 electrically insulated from one another. A brush carrier 13 is journaled on a shaft 14 and carries three equally spaced brushes 15 cooperating with the commutator. These brushes are supplied with three-phase power as via slip rings 16. A pilot motor may be used to drive and control the brush carrier.

It may be considered that the starting points of the three phases of the winding 10 are at whatever three commutating bars are contacted by the brushes. When the brushes 15 are at rest there is, of course, a rotating magnetic field whose speed is directly proportional to the frequency of the voltage supplied to the brushes. If the brush carrier is then rotated at a given speed the starting points of the three phases may be considered as moving along in unison with the three brushes, and accordingly it is found that the field is moving at a new speed determined in R. P. M. by the formula, $120\ f/p+b$, wherein $f$ is the frequency of the supplied voltage in cycles/sec., $p$ is the number of poles, and $b$ is the brush speed in R. P. M. If the generated electromotive forces and the brush speed are in the same direction the field speed will be greater than when the brushes are at rest; likewise, if generated electromotive forces and the brush speed are in opposite directions, the field speed will be less than when the brushes are at rest. This means of varying the magnetic field speed can be readily applied to polyphase induction motors.

Heretofore, polyphase induction motors have consisted essentially of a wound stator fed from a multi-phase supply and a rotor which in the majority of cases is of the so-called squirrel-cage type, although wound rotors are also sometimes used. In any regard, it has been considered that the only possible methods of speed control for such a motor are by control of supply frequency, rotor slip, or number of poles, or by control of a combination of these three factors. In Fig. 2 I have illustrated schematically a three-phase induction motor having its rotor and stator denoted 18, 19. The stator is provided with the winding 10 and commutator 11 and the brush carrier 13 is journaled for rotation independently of the rotor and commutator. This may be accomplished by journal-mounting the carrier on the shaft 20 of the rotor, but best results are achieved by providing a stationary stub shaft 21 carried by the stator. This stub shaft corresponds to the shaft 14 in Fig. 1 and carries the slip rings 16.

In a conventional polyphase induction motor the frequency of the rotor current is dependent upon the rate at which the stator flux is cut by the rotor conductors. When the rotor is at a standstill the relative movement between the stator flux and the rotor conductors is equal to the speed of the stator flux, and accordingly, in such an instance the frequency of the rotor current is the same as that of the supply frequency to the stator. However, in my Fig. 2 embodiment, when the rotor is at a standstill and the brushes are rotating, the frequency of the rotor current is either greater or less than the supply frequency depending upon the direction of brush rotation because the speed of the stator flux is varied by the speed of the brushes. Thus it is seen that if the rotor in Fig. 2 is locked at rest and tapped a frequency converter results which is controlled by varying the speed of the brushes.

Assuming now that the rotor in Fig. 2 is free to turn, if the brushes are at rest the rotor will build up speed as in any induction motor until the electromotive force generated in the rotor circuit is the right amount to supply sufficient current to produce a propelling torque on the rotor and the mechanical losses combined. Assuming a constant load for the moment, the speed of the rotor will be determined by the speed of the stator flux, and since this flux speed is variable by changing the brush speed, it is seen that the rotor speed can be controlled by varying the brush speed. Change in rotor slip due to load changes will modify this speed relation the same as in conventional induction motors. Thus it is seen that rotating the brushes in effect changes the so-called synchronous speed of the motor.

It will be apparent from the above discussion that if the rotor 18 in Fig. 2 is a synchronous motor type excited with direct current via slip rings on the rotor shaft instead of being an induction-type rotor that the motor becomes a variable speed synchronous motor.

In the Fig. 2 embodiment the stator was the inducing component of the motor. However, a polyphase motor of very desirable characteristics can be constructed with the rotor as the inducing member by using my rotating brush concept. A three-phase version of such a motor is illustrated schematically in Fig. 3 with the rotor and stator windings, for purposes of example, being given a delta delta relationship. The shaft 22 for the rotor, denoted 23, is provided with the slip rings 24, for carrying power to the three phases 25 of the rotor winding and the stator 26, as before, is provided with the winding 10 and commutator 11. Also, as in the Fig. 2 embodiment, the brush carrier 13 is journaled for independent rotation on a stub shaft 27 carried by the stator. The brushes 15 are electrically connected to center-taps of the three rotor phases 25 as by elongated flexible leads 28 or via slip rings mounted on the stub shaft 27.

Reference to transformer principles is helpful in arriving at an understanding of the operation of the motor of Fig. 3, and at this time it should be understood that the rotor and stator windings are purposely given a one to one ratio and may be either simplex or duplex series D. C. windings. These rotor and stator windings may be considered for purposes of explanation as the primary and secondary windings, respectively, of three single-phase transformers connected delta delta. In such an instance the voltage induced in the secondary phases is equal to that of the primary phases and the voltage at the centers of the latter are at the same potential as the centers of the secondary phases so that if these phase centers were cross-tapped there would be no current flow between the primary and secondary. If the secondary phase taps were shifted away from their phase centers, leads from these shifted secondary tap positions to the center-taps of the primary would no longer interconnect equal potential points and a current flow would result therein from the higher to the lower potential. Maximum current would be achieved when the secondary phase taps were shifted 180 electrical degrees either way with respect to the center-taps of the primary phases.

In the Fig. 3 motor the rotatable brushes 15 cooperating with the commutator bars 12 give a means to advance the tap positions of the secondary or stator phases with respect to the center-taps of the primary or rotor phases. When the brushes are advanced to a new position by turning the brush carrier relative to the rotor, current results in the windings which produces rotor and stator magnetic fields. These are displaced with respect to one another and so in turn create a torque which urges the rotor to turn in the same direction as the brushes were advanced. When the rotor reaches the new brush position there would no longer be a voltage difference at opposite ends of leads 28, and hence current and torque would return to zero. If the brushes, instead of being advanced to a new position and stopped, are continuously rotated as by a pilot motor, voltage will be continuously induced in the stator winding and a constant advance of the brushes with respect to the center-taps of the rotor phases will result in a corresponding continuous current flow producing displaced rotating rotor and stator fields. These fields, as in the case of the field of winding 10 in Fig. 1, will be rotating at greater or less speed than would be caused by supply frequency alone depending upon which direction the brushes are turning with respect to the magnetic lines of force. At any rate the rotor field will always lag the stator field a sufficient amount to create the required torque, or in other words, for a given load, at a given speed, the brushes will lead the rotor at the correct angle to satisfy the load requirement. Motor speed is solely determined by the speed at which the brush carrier is driven. Hence, in this regard the motor of Fig. 3 differs from that of Fig. 2 since in the latter case motor speed was dependent upon supply frequency as well as brush speed.

It is possible that the rotor in the Fig. 3 embodiment could be so loaded that the brushes might turn through several revolutions relative to the rotor, or in other words, the brushes might overrun the maximum torque range. To prevent such an occurrence a stop pin 30 is mounted on the rotor shaft and two limit pins 31 are mounted on the brush carrier.

To discourage arcing it is desirable to substitute a pair of brushes 15' for each brush 15 and to connect the pair to the ends of a respective inductance coil 32 (Fig. 4). These coils 32 are center-tapped to the brush leads. The brushes of each pair are insulated apart and have a width such that at least one of them will be in contact with a commutator bar.

A small universal motor controlled through a Variack or rheostat serves as a satisfactory pilot motor 17 in most applications. Where numerous of my slave motors need be synchronously controlled through wide ranges of speed, their respective bush systems could be locked together with selsyn receivers and controlled from one system transmitter.

It is thought that the invention will have been clearly understood from the foregoing detailed description. Changes within the spirit of my teachings may be resorted to without departing from the invention and it is accordingly my intention that the hereto annexed claims be given a scope in their construction fully commensurate with the broadest interpretation to which the employed language admits.

I claim:

1. In a polyphase alternating current motor, a rotatable inducing member provided with a polyphase winding electrically connected with a polyphase alternating current source to create poles on said inducing member, an induced member having a commuted polyphase winding inductively related to the winding of said inducing member having a one-to-one turn ratio with respect thereto, a brush carrier having equally spaced brush assemblies cooperating with said commuted winding and electrically connected together via said winding of the inducing member, said brush carrier being rotatable with respect to said inducing and induced members, and stop means for limiting the rotation of said carrier with respect to said inducing member.

2. In a polyphase alternating current motor, a rotor wound with a polyphase primary winding to have an even number of poles, a stator having a polyphase secondary winding inductively related to said primary winding and having a one-to-one turn ratio with respect thereto, a commutator tapped to said secondary winding, a bush carrier having brushes electrically connected to equal potential points of the phases of said primary winding and cooperating with said commutator, said carrier being independently rotatable with respect to said rotor and said commutator, and stop means for limiting the rotation of said carrier with respect to said rotor.

3. In a polyphase alternating current motor, a rotatable inducing member provided with a polyphase winding electrically connected with a polyphase alternating current source to create poles on said inducing member, an induced member having a commuted polyphase winding inductively related to the winding of said inducing member and having a one-to-one turn ratio with respect thereto, a brush carrier having a respective brush assembly for each phase and cooperating with said commuted winding, said brush assemblies being electrically interconnected with said current source and said brush carrier being rotatable with respect to said inducing and induced members, and stop means for limiting the rotation of said carrier with respect to said inducing member.

References Cited in the file of this patent

UNITED STATES PATENTS

| | | |
|---|---|---|
| 510,534 | Gorges | Dec. 12, 1893 |
| 748,907 | Ziegenberg | Jan. 5, 1904 |
| 1,254,902 | Hale | Jan. 29, 1918 |
| 1,526,613 | Stephenson | Feb. 17, 1925 |
| 2,008,360 | Lell | July 16, 1935 |
| 2,152,327 | Rauhut | Mar. 28, 1939 |
| 2,739,278 | Blankenship | Mar. 20, 1956 |

FOREIGN PATENTS

| | | |
|---|---|---|
| 498,968 | Belgium | Nov. 14, 1950 |